July 5, 1932.  R. T. HOSKING  1,866,304
LOCK WASHER
Filed Dec. 16, 1927
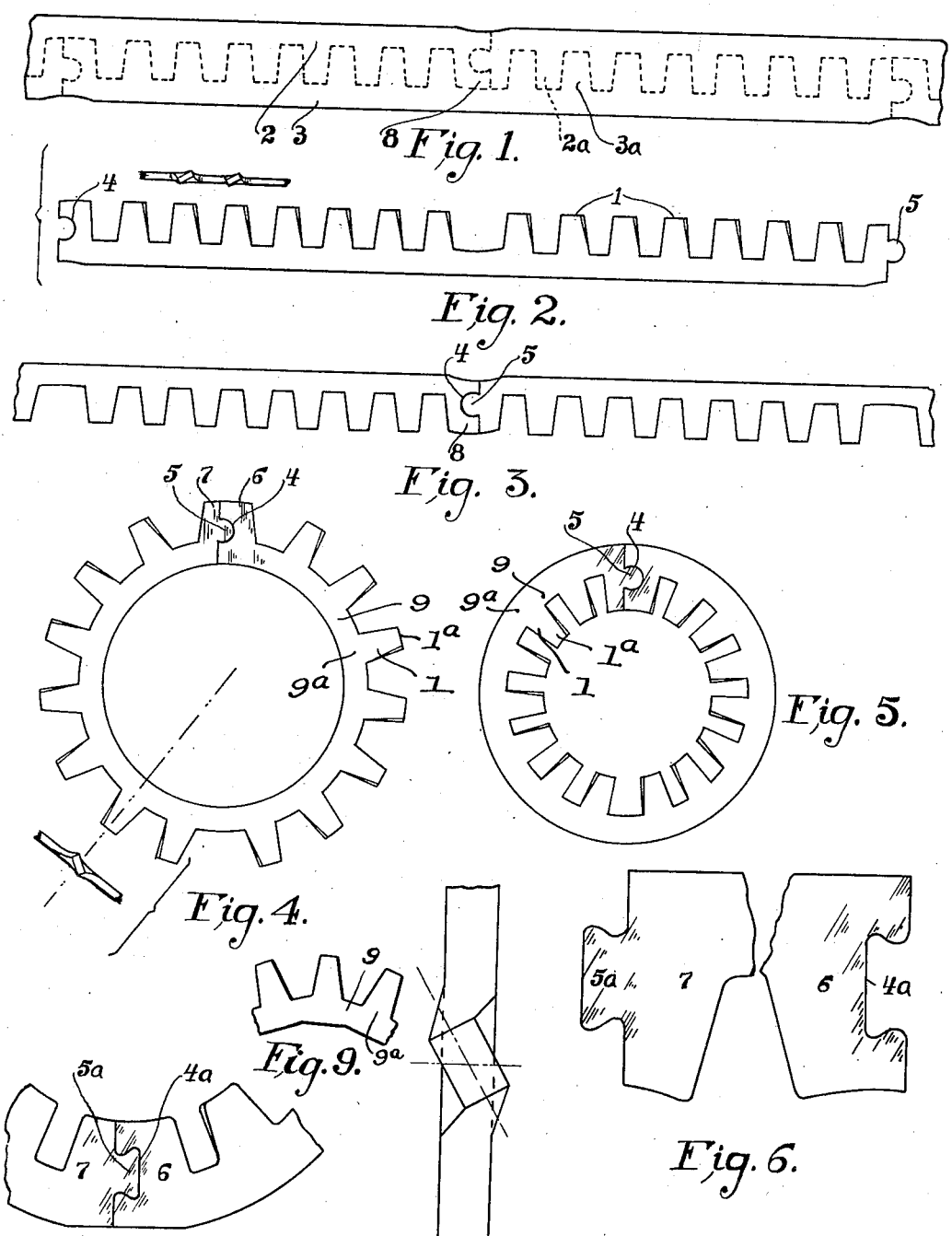
INVENTOR
RICHARD T. HOSKING
BY
ATTORNEY Patented July 5, 1932

1,866,304

UNITED STATES PATENT OFFICE

RICHARD T. HOSKING, OF WILMETTE, ILLINOIS, ASSIGNOR, BY MESNE ASSIGNMENTS, TO SHAKEPROOF LOCK WASHER COMPANY, INCORPORATED, OF CHICAGO, ILLINOIS, A CORPORATION OF DELAWARE

LOCK WASHER

Application filed December 16, 1927. Serial No. 240,393.

This invention is an article of manufacture, namely, a lock washer, of the well-known "Hosking" type known in the trade as "Shakeproof" and described in my Patent No. 1,419,564, issued June 13, 1922, and characterized by an annular ring of thin metal having radially projecting prongs that are twisted axially to form locking teeth that tend to roll when the locked nut is rotated in reverse direction for unscrewing.

An object of my present invention as claimed is to construct a washer of this type so it can be easily and rapidly formed from a straight stock strip that has regular prongs along one of its edges, the ends of the strip secured together by an interlocked joint formed from the material at the end teeth of the strip.

A further object is to provide a washer formed by bending a toothed stock strip wherein the root portions of the teeth are not strained and consequently preserve their initial strength.

Either an internal toothed washer or an external toothed washer can be made from the same stock strip.

For the purpose of this invention the twisted-prong stock strip is understood to be the initial or basic material from which the washer herein claimed is produced as an article of manufacture. The strip itself, as a basic material for a washer of this character, is described and claimed in my co-pending application Serial No. 240,394, filed December 16, 1927.

With the foregoing and certain other objects in view, which will appear later in the specification, my invention comprises the devices described and claimed and the equivalents thereof.

In the drawing Fig. 1 is a face view of a ribbon from which two stock strips may be made.

Fig. 2 is a face view of a length of stock strip sufficient to produce a washer.

Fig. 3 is a face view of parts of two stock strips, their ends interlocked.

Fig. 4 is a plan view and tooth-end detail of an external toothed washer made from the stock strip shown in Fig. 2.

Fig. 5 is a similar view of an internal toothed washer made from the same stock strip.

Fig. 6 is a fragmentary view of the two ends of a stock strip, showing interlocking joint members of modified form.

Fig. 7 shows the joint members of Fig. 6 interlocked.

Fig. 8 is a diagrammatic end view of a twisted tooth.

Fig. 9 is an exaggerated detail showing a bent portion of the washer.

As is clearly shown in the drawing, a stock strip of metal, as shown in Fig. 2, is provided having an edge formed with regular prongs 1, axially twisted, and having ends shaped so as to be capable of being interlocked with each other.

Two such stock strips may be made from one ribbon of metal, in the manner indicated by dotted lines in Fig. 1, by severing the ribbon lengthwise into two strips 2, 3 with prongs 2a, 3a interdigitating. Preferably, an end of each pronged stock strip is formed with a recess 4, which may be of any suitable shape, as part circular, illustrated in Figs. 2 to 5, or keystone shape, as at 4a in Figs. 6 and 7. The other end of the strip is formed with a complementary projection 5 or 5a.

The stock strip, with its prongs twisted as in Fig. 2, is bent into annular form with the prongs outward, if an external toothed washer, Fig. 4, is desired, or with the prongs inward, as in Fig. 5 if the internal toothed washer is desired. The ends of the bent strip are preferably fastened together by interlocking as shown in Figs 4 and 7. The interlocking joints are given strength and stiffness by making the end prongs 6, 7 slightly larger than the intermediate ones and forming the recess 4 and the projection 5 from those prongs. Moreover, the two complemental ends prongs 6, 7 may be cut from a single wide prong 8 as shown in Fig. 3.

The end prongs are preferably not twisted, and as to the intermediate prongs 1 either all or some of them may be twisted as circumstances may require. If all are twisted the locking effect of the washer is greatest, but if it is desired to provide a washer that will permit the nut or bolt to be unscrewed more easily, then it is desirable to have a lesser number of the intermediate teeth twisted.

The stock strip is more easily bent at the parts of the annular ring 9 between teeth than it is at a tooth, hence bending actually occurs between teeth, to a greater degree than at the base portions of the teeth, leaving the metal of the tooth proper 1 and that part 9a of the annular ring that constitutes the base of the tooth practically free from strain or tension. The body of the tooth is thus permitted to lie flat between the faces of the nut and the work, and its twisted end 1a is allowed to assume in a normal manner the correct locking position.

It is desirable in external toothed washers that the working ends of the teeth be spaced far enough apart circumferentially to insure for each tooth ample clearance area in which to grip the work so that when the nut is forcibly unscrewed the tooth will not be brought too quickly into the depression that has been cut in the work by the preceding tooth. If the ends of the teeth are too close together the nut might loosen too readily upon unscrewing. On the other hand, it is desirable that the teeth of internal toothed washers be quite close together at their ends, because they necessarily grip the nut nearer its center and consequently require greater holding power to provide a given resistance to unscrewing.

The illustrations, Figs. 4 and 5, show that my improved circularly bent strip construction answers both of those requirements and that in the act of forming the circular ring from the straight strip the circumferential spacing of the ends of the teeth is automatically increased in external washers and is automatically decreased in internal washers, although the identical stock strip can be used for making either an internal toother washer or an external toothed washer.

Having thus described my invention, what I claim and desire to secure by Letters Patent is:

As an article of manufacture a lock washer comprising an annular ring having axially twisted teeth formed thereon, said teeth spaced apart at their roots a distance equal to the width of a tooth at its point, those portions of said ring that are located between successive teeth being bent circumferentially to a greater degree than the base portions of the teeth of said ring, for the purposes set forth.

In testimony whereof, I affix my signature.

RICHARD T. HOSKING.